Figure 1:
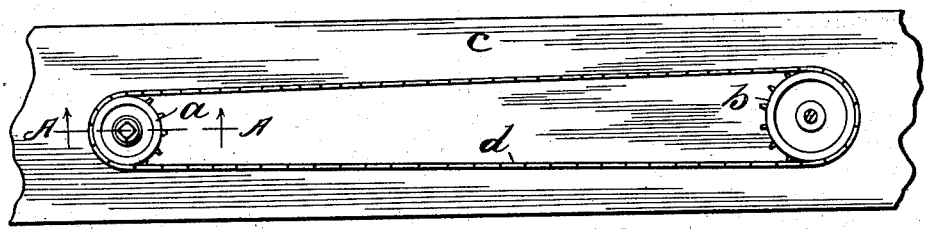

No. 712,588. Patented Nov. 4, 1902.
J. A. PLOPPER.
ADJUSTABLE BEARING FOR WHEELS.
(Application filed Mar. 22, 1902.)
(No Model.)

Witnesses:
R. J. Jacker
R. A. Gustafson

Inventor:
James A. Plopper,
By Colum, McRoberts & McElroy
Attys.

THE NORRIS PETERS CO., PHOTO-LITHO., WASHINGTON, D. C.

UNITED STATES PATENT OFFICE.

JAMES A. PLOPPER, OF CHICAGO, ILLINOIS, ASSIGNOR TO PLANO MANUFACTURING COMPANY, OF CHICAGO, ILLINOIS, A CORPORATION OF ILLINOIS.

ADJUSTABLE BEARING FOR WHEELS.

SPECIFICATION forming part of Letters Patent No. 712,588, dated November 4, 1902.

Application filed March 22, 1902. Serial No. 99,451. (No model.)

*To all whom it may concern:*

Be it known that I, JAMES A. PLOPPER, a citizen of the United States, residing at Chicago, in the county of Cook and State of Illinois, have invented certain new and useful Improvements in Adjustable Bearings for Wheels, &c., of which the following is a specification.

My invention is concerned with a certain new and useful improvement in bearings for wheels for sprocket-chains, belts, &c., whereby one of a pair of such wheels may be moved to and from the other to take up or regulate the slack in the chain or belt and is designed to produce a device of the class described which shall be simple in its construction and efficient in operation and which can be quickly adjusted and secured in any desired position.

To illustrate my invention, I annex hereto a sheet of drawings, in which the same reference characters are used to designate identical parts in all the figures, of which—

Figure 2:
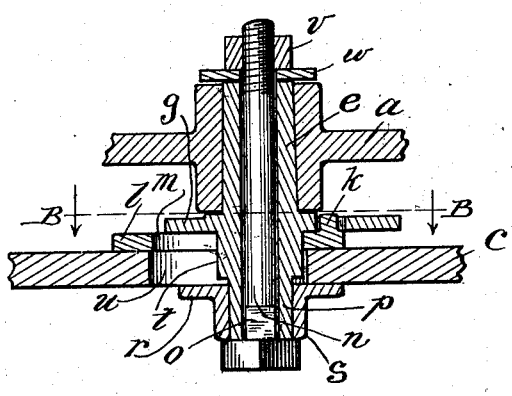
Figure 3:
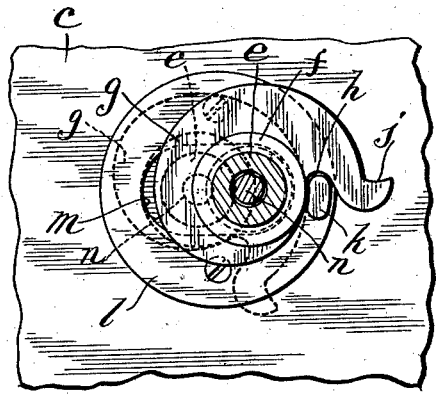
Figure 4:
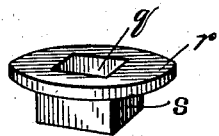
Figure 5:
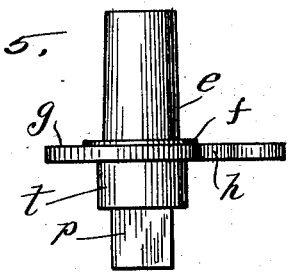

Figure 1 is a plan view of a pair of pulley-wheels and a chain having my invention applied to one of the wheels. Fig. 2 is a sectional view thereof, on an enlarged scale, on the line A A of Fig. 1. Fig. 3 is a plan view of the same in section on the line B B of Fig. 2. Fig. 4 is a detached perspective view of a clamping-ring employed in connection therewith, and Fig. 5 is a side elevation of the bearing-sleeve detached.

The sprocket-wheels $a$ and $b$ are shown as mounted adjacent to the plate $c$ and as connected by the chain $d$. The bearing of the wheel $b$ may be of any ordinary construction, as my invention is shown only as applied to the sprocket-wheel $a$. The bearing member $e$ preferably takes the form of a sleeve, the upper outer surface of which serves as the actual bearing for the wheel $a$. A shoulder $f$ may be employed, upon which the bottom of the wheel-hub rests. Beneath the bearing proper is a spiral cam-flange $g$, which is formed with a shoulder $h$ at its inner end and with a shoulder $j$ at its outer end, the two shoulders coöperating with the lug $k$ on the base-piece $l$ serving to limit the movement of the bearing-sleeve. This base-piece $l$ preferably takes the form of a disk, which is screwed or otherwise secured upon the plate $c$ and is provided with the slot $m$, which is elongated in the direction of the chain, so that as the sleeve $e$ is turned about its axis the spiral outer edge of the flange $g$, coöperating with the inner edge of the lug $k$, will cause the bearing to be shifted along the slot $m$, so as to bring it into any desired position of adjustment. When the desired position of adjustment is obtained, it is clamped by means of the bolt $n$, which preferably has the squared lower portion $o$ adjacent to the head coöperating with the correspondingly-shaped interior of the lowermost portion $p$ of the sleeve $e$. The outer surface of this portion $p$ is also preferably squared in cross-section and fits in the correspondingly-shaped aperture $q$ in the clamping member $r$, which preferably takes the form of a ring with the squared lower portion $s$. The portion $t$ of the sleeve $e$ between the flange $g$ and the lowermost portion $p$ is circular in outline and passes down through the slot $m$ in the base-ring and through a correspondingly-shaped slot $u$, formed in the plate $c$. The head of the bolt $n$ coöperates with the under surface of the clamping-ring $r$, and the nut $v$ on the end thereof coöperates through the washer $w$ with the top of the sleeve $e$, so that when the parts are properly positioned and the nut $v$ is tightened, and they will be rigidly clamped in the desired position of adjustment.

While I have shown my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is—

1. In a device of the class described, the combination with the bearing member having the cam-flange thereon, of the base-piece having a lug adapted to coöperate with said flange, and means for clamping the bearing member securely in any desired position of adjustment on the base-piece.

2. In a device of the class described, the combination with the bearing member having the bearing portion proper and the positioning portion separated by the cam-flange, of the base-piece having the elongated slot therein through which the adjusting portion of the bearing member passes and the lug thereon with which its cam-flange coöperates, and means for clamping the bearing member in any desired position of adjustment upon the base-piece.

3. In a device of the class described, the combination with the bearing-sleeve $e$ having the bearing portion proper and the cam-flange $g$, and the portion $t$, of the base-disk $l$ having the elongated slot $m$ therein and the lug $k$ thereon in the plane of the flange $g$, the clamping member $r$, and the bolt $n$ passing through the clamping member, the base-disk and the sleeve and serving with its coöperating nut to securely clamp the parts in any desired position of adjustment.

4. In a device of the class described, the combination with the base-piece $l$ having the elongated slot $m$ therein and the lug $k$ thereon, of the bearing-sleeve having the bearing portion and the portion $t$ adapted to pass through the slot $m$, the spiral cam-flange between said portions having the shoulders $h$ and $j$, the lowermost squared portion $p$ of said sleeve, the clamping member $r$ having the squared aperture $q$ with which the portion $p$ coöperates, and the bolt and nut passing through said parts and serving to clamp them securely in any desired position of adjustment.

In testimony whereof I affix my signature in presence of two witnesses.

JAMES A. PLOPPER.

Witnesses:
M. R. GOULD,
L. M. FOOTE.